United States Patent Office 2,837,544
Patented June 3, 1958

2,837,544
SYNTHESIS OF STEROIDS

Josef Fried, New Brunswick, N. J., assignor to Olin Mathieson Chemical Corporation, New York, N. Y., a corporation of Virginia No Drawing. Application March 25, 1957
Serial No. 647,949

13 Claims. (Cl. 260—397.45)

This invention relates to the synthesis of valuable steroids; and it has for its objects the provision of (I) an advantageous process of preparing steroids of the pregnene (including the pregnadiene) series, having a 9α-halo group and a cyano or thiocyano radical in the 21-position; and (II) the new physiologically-active steroids formed thereby.

The process of this invention essentially comprises interacting a 21-(organic sulfonic acid ester) of a 9α-halo-21-hydroxy-steroid of the pregnene (including the pregnadiene) series with either a cyanide or thiocyanate and recovering the 21-cyano or thiocyano steroid formed thereby.

The preferred compounds obtainable by the process of this invention are those which are comprehended by the general formula

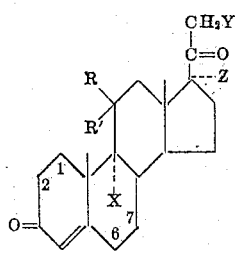

wherein the 1,2 and 6,7 positions are saturated or double-bonded, and wherein R is hydrogen R' is β-hydroxy or together R and R' is keto, X is halogen (preferably fluoro or chloro), Y is cyano or thiocyano, and Z is hydrogen or α-hydroxy.

Representative steroids obtainable by the process of this invention include: 9α-halo-21-cyano-11β,17α-dihydroxyprogesterones (e. g. 9α-fluoro-21-cyano-11β,17α-dihydroxyprogesterone); 9α-halo-21-cyano-11β-hydroxyprogesterones; 9α-halo-21-cyano-Δ$^{1,4}$-pregnadiene-11β-17α-diol-3,20-diones, 9α-halo-21-cyano-Δ$^{1,4}$-pregnadiene-11β-ol-3,20-diones; 9α-halo-21-cyano-Δ$^{4,6}$ - pregnadiene - 11β, 17α-diol-3,20-diones; 9α-halo-21-cyano-Δ$^{4,6}$-pregnadiene-11β-ol-3,20-diones; 9α-halo-21-cyano-11 - keto - 17α - hydroxy-progesterones (e. g. 9α-fluoro-21-cyano-Δ$^4$-pregnene-17α-ol-3,11,20-trione); 9α-halo-21-cyano - 11 - keto-progesterones; 9α-halo-21-cyano-Δ$^{1,4}$-pregnadiene-17α-ol-3,11,20 - triones; 9α - halo - 21 - cyano - Δ$^{1,4}$ - pregnadiene-3,11,20-triones; 9α-halo-21-cyano-Δ$^{4,6}$- -pregnadiene-ol-3,11,20-triones; 9α-halo-21 - cyano - Δ$^{4,6}$ - pregnadiene-3,11,20-triones; 9α-halo-21-thiocyano-11β,17α-dihydroxyprogesterones (e. g. 9α-fluoro-21-thiocyano-11β,17α-dihydroxyprogesterone); 9α-halo-21 - thiocyano - 11β - hydroxyprogesterones; 9α-halo-21-thiocyano-Δ$^{1,4}$-pregnadiene-11β,17α-diol-3,20-diones; 9α-halo-21-thiocyano - Δ$^{1,4}$- pregnadiene-11β-ol-3,20-dione; 9α - halo - 21 - thiocyano-Δ$^{4,6}$-pregnadiene-11β,17α-diol-3,20-diones; 9α - halo - 21-thiocyano-Δ$^{4,6}$-pregnadiene-11β-ol-3,20 - dione; 9α - halo-21-thiocyano-11-keto-17α-hydroxy-progesterones (e. g. 9α - fluoro - 21 - thiocyano - Δ$^4$ - pregnene - 17α - ol-3,11,20 - trione); 9α - halo - 21 - thiocyano - 11 - keto-progesterones; 9α - halo - 21 - thiocyano - Δ$^{1,4}$ - pregnadiene - 17α - ol - 3,11,20 - triones; 9α - halo - 21 - thiocyano-Δ$^{1,4}$ - pregnadiene - 3,11,20 - triones; 9α - halo - 21 - thiocyano-Δ$^{4,6}$-pregnadiene-17α-ol-3,11,20-triones; and 9α-halo-21-thiocyano-Δ$^{4,6}$-pregnadiene-3,11,20-triones.

To prepare these compounds, a steroid of the following general formula is employed as the steroid reactant:

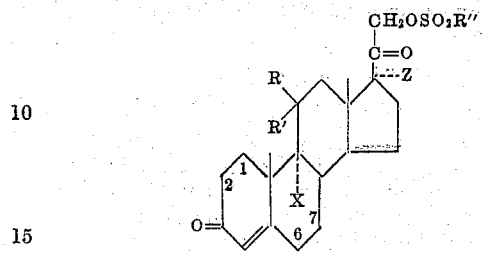

wherein the 1,2 and 6,7 positions are saturated or double-bonded, R, R', X, Y and Z are as hereinbefore defined, and R'' is alkyl or aryl (preferably lower alkyl, such as methyl, or monocyclic hydrocarbon aryl, such as tolyl). Representative steroids suitable as initial reactants in the process of this invention and their method of preparation are disclosed in the U. S. application of Josef E. Herz and Josef Fried, Serial No. 516,333, filed June 17, 1955.

To prepare the steroids of this invention, these 21-organic sulfonic acid esters are treated with either a cyanide or a thiocyanate. The preferred reactants are inorganic cyanides and thiocyanates, such as the alkali metal cyanides (e. g. potassium cyanide) and the alkali metal thiocyanates (e. g. potassium thiocyanate). The reaction is preferably conducted in an inert organic solvent at an elevated temperature (e. g. the reflux temperature of the resultant mixture). In order to assure maximum yield, at least one mole of cyanide or thiocyanate should be present per mole of steroid.

The steroids of this invention are physiologically active compounds which possess glucocorticoid activity. Thus, these new steroids can be administered instead of, and in the same manner as, cortisone or hydrocortisone in the treatment of rheumatoid arthritis. The dosage for such administration is, or course, dependent on the relative activity of the compound.

The following examples are illustrative of the invention (all temperatures being in centigrade):

EXAMPLE 1

*9α-fluoro-21-cyano-Δ$^4$-pregnene-11β,17α-diol-3,20-dione*

To a solution of 125 mg. of 9α-fluorohydrocortisone 21-mesylate in 20 ml. of methanol is added a solution of 50 mg. of potassium cyanide in 1 ml. of water and the mixture refluxed for 10 minutes. After most of the methanol is removed in vacuo, water is added and the resultant crystals filtered and washed with water. The dried cyano compound after recrystallization from 95 percent alcohol has the following properties: M. P. about 291–293°; [α]$_D^{23}$+139° (c. 0.39 in 95% alcohol); λ$_{max.}$ alc. 237 mμ (ε=15,600); λ$_{max.}$ Nujol 2.90, 2.97, 4.46, 6.15μ.

*Analysis.*—Calcd. for C$_{22}$H$_{28}$O$_4$FN (389.42): C, 67.85; H, 7.24; N, 3.59. Found: C, 68.04; H, 7.09; N, 3.44.

Similarly, if 9α-chlorohydrocortisone mesylate is substituted for the 9α-fluorohydrocortisone mesylate in the procedure of Example 1, 9α-chloro-21-cyano-Δ$^4$-pregnene-11β,17α-diol-3,20-dione is obtained.

EXAMPLE 2

*9α-fluoro-21-cyano-Δ$^{1,4}$-pregnadiene-11β,17α-diol-3,20-dione*

By substituting 9α-fluoro-1-dehydrohydrocortisone 21-mesylate for the 9α-fluorohydrocortisone 21-mesylate in the procedure of Example 1, there is obtained in good yield 9α-fluoro-21-cyano-Δ¹,⁴-pregnadiene-11β,17α-diol-3,20-dione.

EXAMPLE 3

*9α-fluoro-21-cyano-Δ⁴,⁶-pregnadiene-11β,17α-diol-3,20-dione*

By substituting 9α-fluoro-6-dehydrohydrocortisone 21-mesylate for the 9α-fluorohydrocortisone 21-mesylate in the procedure of Example 1, there is obtained in good yield 9α-fluoro-21-cyano-Δ⁴,⁶-pregnadiene-11β,17α-diol-diol-3,20-dione.

EXAMPLE 4

*9α-fluoro-21-cyano-Δ⁴-pregnene-17α-ol-3,11,20-trione*

To a solution of 50 mg. of 9α-fluoro-21-cyano-Δ⁴-pregnene-11β,17α-diol-3,20-dione in 5 ml. of acetone is added with stirring 0.1 ml. of a solution of 200 mg. of chromic acid and 320 mg. of sulfuric acid in 1 ml. water. After 30 minutes, a few drops of alcohol were added to destroy excess chromic acid and the mixture diluted with water, after removal of the acetone in vacuo, chloroform was added and the resulting chloroform extract washed with water and sodium bicarbonate. After drying over sodium sulfate and removal of the solvent in vacuo, the desired 9α-fluoro-21-cyano-Δ⁴-pregnene-17α-ol-3,11,20 - trione remains as a crystalline residue, which is crystallized from 95% ethanol.

9α-fluoro-21-cyano-Δ⁴-pregnene-17α-ol - 3,11,20 - trione can also be prepared by substituting 9α-fluorocortisone 21-mesylate for 9α-fluorohydrocortisone 21-mesylate in the procedure of Example 1.

In a similar manner, 9α-fluoro-21-cyano-Δ¹,⁴-pregnadiene-11β,17α-diol-3,20-dione and 9α-fluoro-21-cyano-Δ⁴,⁶-pregnadiene-11β,17α-diol-3,20-dione can be converted by the process of Example 4 to 9α-fluoro-21-cyano-Δ¹,⁴-pregnadiene-17α-ol-3,11,20-trione and 9α-fluoro-21-cyano-Δ⁴,⁶-pregnadiene-17α-ol-3,11,20-trione, respectively.

EXAMPLE 5

*9α-fluoro-21-thiocyano-Δ⁴-pregnene-11β,17α-diol-3,20-dione*

A solution of 100 mg. of 9α-fluorohydrocortisone 21-mesylate and 50 mg. of anhydrous potassium thiocyanate in 8 ml. of acetone is refluxed for 3.5 hours. Water is then added and the acetone removed in vacuo. The resulting crystals are removed by filtration, washed with water, dried and recrystallized from 95% alcohol. The pure 21-thiocyanate has the following properties: M. P. about 230–232°; [α]$_D^{23}$ +123° (c. 0.30 in 95% alcohol); λ$_{max.}$ᵃˡᶜ· 237 mµ (ε=18,700); λ$_{max.}$ᴺᵘʲᵒˡ 2.85–2.90, 2.98, 4.63, 5.85, 6.10µ.

*Analysis.*—Calcd. for $C_{22}H_{28}O_4FSN$ (421.44): C, 62.69; H, 6.69; S, 7.59; N, 3.32. Found: C, 62.83; H, 6.65; S, 7.45; N, 3.03.

In a similar manner, 9α-chlorohydrocortisone 21-mesylate, 9α-fluoro-1-dehydrohydrocortisone 21-mesylate, 9α-fluoro-6-dehydrohydrocortisone 21-mesylate, and 9α-fluorocortisone 21-mesylate can be converted to their respective 21-thiocyanate derivatives.

The invention may be variously otherwise embodied within the scope of the appended claims.

I claim:

1. A compound selected from the group consisting of steroids of the general formulae

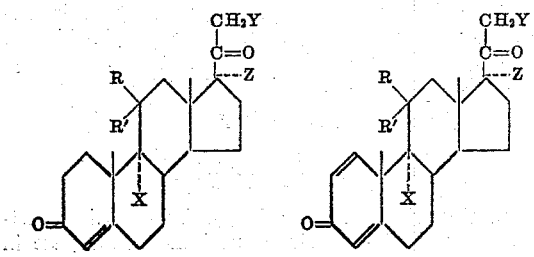

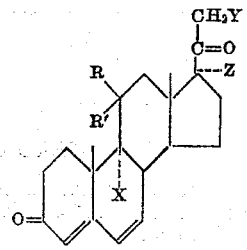

wherein R is hydrogen, R' is β-hydroxy and together R and R' is keto, X is halogen, Y is selected from the group consisting of cyano and thiocyano, and Z is selected from the group consisting of hydrogen and α-hydroxy.

2. 9α-halo-21-cyano-Δ⁴-pregnene - 11β,17α - diol - 3,20-dione.

3. 9α-fluoro-21-cyano-Δ⁴-pregnene-11β,17α-diol - 3,20-dione.

4. 9α-halo-21-cyano-Δ¹,⁴ - pregnadiene - 11β,17α - diol-3,20-dione.

5. 9α-halo-21-cyano-Δ⁴,⁶ - pregnadiene - 11β,17α - diol-3,20-dione.

6. 9α-halo-21-cyano - Δ⁴ - pregnene - 17α - ol - 3,11,20-trione.

7. 9α-halo-21-thiocyano-Δ⁴ - pregnene - 11β,17α - diol-3,20-dione.

8. 9α-fluoro-21-thiocyano-Δ⁴-pregnene - 11β,17α - diol-3,20-dione.

9. A process for preparing the compounds of claim 1, which comprises interacting a compound selected from the group consisting of steroids of the general formulae

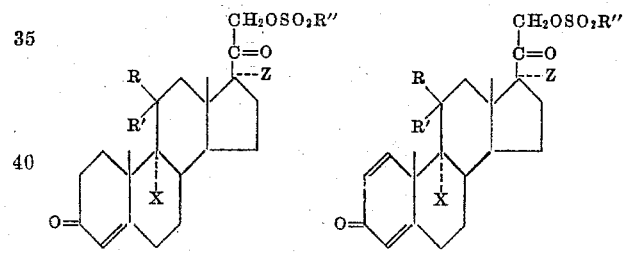

and

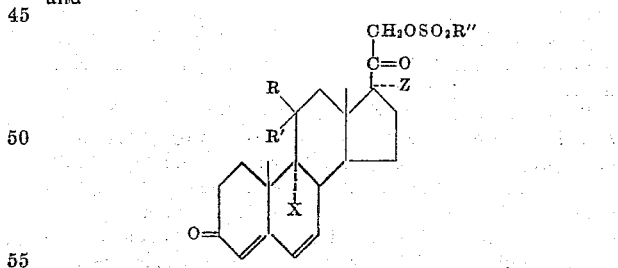

wherein R is hydrogen, R' is β-hydroxy and together R and R' is keto, R" is selected from the group consisting of alkyl and aryl, X is halogen and Z is selected from the group consisting of hydrogen and α-hydroxy, with a compound selected from the group consisting of inorganic cyanides and inorganic thiocyanates, and recovering the resultant steroid.

10. The process of claim 9, wherein an alkali metal cyanide is used and a 21-cyano steroid is recovered.

11. The process of claim 10, wherein the alkali metal cyanide is potassium cyanide and the reaction is conducted at an elevated temperature.

12. The process of claim 9, wherein an alkali metal thiocyanate is used and a 21-thiocyano steroid is recovered.

13. The process of claim 12, wherein the alkali metal thiocyanate is potassium thiocyanate and the reaction is conducted at an elevated temperature.

No references cited.